Oct. 14, 1969     G. E. CHRISTIANSEN     3,472,283

SINGLE-LEVER OPERATED MIXING VALVE

Filed May 29, 1967

INVENTOR.
G.E. CHRISTIANSEN
BY
Robb+Robb
attorneys

United States Patent Office 3,472,283
Patented Oct. 14, 1969

3,472,283
SINGLE-LEVER OPERATED MIXING VALVE
Gerald E. Christiansen, Flora, Ind., assignor to
Stephen A. Young, Monticello, Ind.
Filed May 29, 1967, Ser. No. 641,807
Int. Cl. E03b; E03c; F17d
U.S. Cl. 137—636.3                      7 Claims

ABSTRACT OF THE DISCLOSURE

This invention comprises a mixing valve primarily for use in domestic installations for kitchen and bathrooms, which avails of a single control member to adjust the temperature of water directed from the usual spout, and such member likewise being availed of to turn the water on and off, the movement of the member or lever being a compound movement involving swinging back and forth as well as rotation to effect the mixing and on and off control.

Single lever faucets to which this invention is directed, are known in the art, and the primary object of the instant invention is to improve upon the operating structure and to simplify the same so that an effective mixing action is provided and on and off control possible by rotation of a single lever and to swing the same for the said actions, and since the construction is simple, reduce the probabilities of wear and increase the length of life of the unit as a whole.

A further object of the invention is to provide novel structure in which the mixing action of water or the like is and the parts used for mixing and shut-off actions being of simple arrangement so that machining of the various elements may be at minimum cost.

A still further object of the invention is to provide very simple basic elements including a body which is of uncomplicated construction and may thereby be made by several different processes, the control section of a different material desirably and thus of a form which may be molded, a large number of screw machine parts being availed of to carry out the intended operation and seals of common form incorporated in the structure with minimum wear areas being designed to improve not only the operation but the life of the fitting or fixture as a whole.

A more specific object of the invention is to provide novel arrangement of the parts so that assembly may be readily undertaken, disassembly effected for replacement of any parts necessary, with certain novel combinations of elements tending to reduce the overall cost of the fitting as well as increase the efficiency of operation thereof.

Other and further objects of the invention will be understood from a consideration of the specification appended hereto and disclosed in the drawing wherein.

Figure 1:
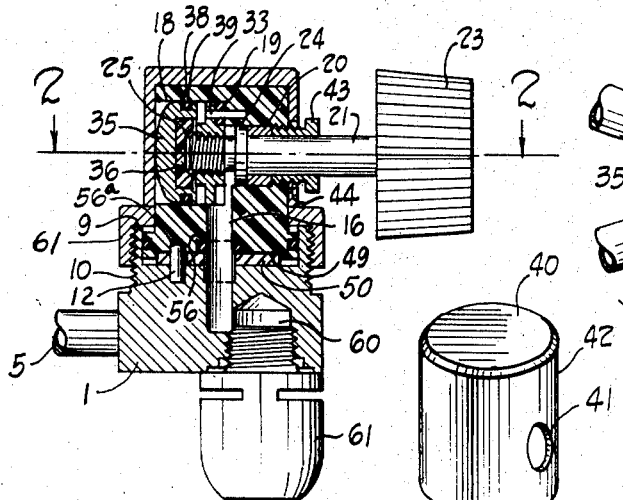
FIGURE 1 is a vertical sectional view through the fitting and indicating the relationship of various parts.
Figure 3:
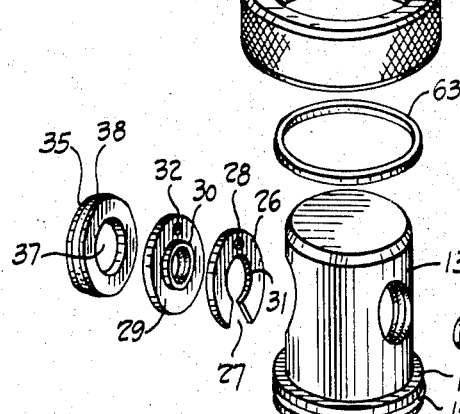
FIGURE 3 is an exploded view indicating the various realtionships between the parts and indicating the method of assembly thereof.
Figure 3:
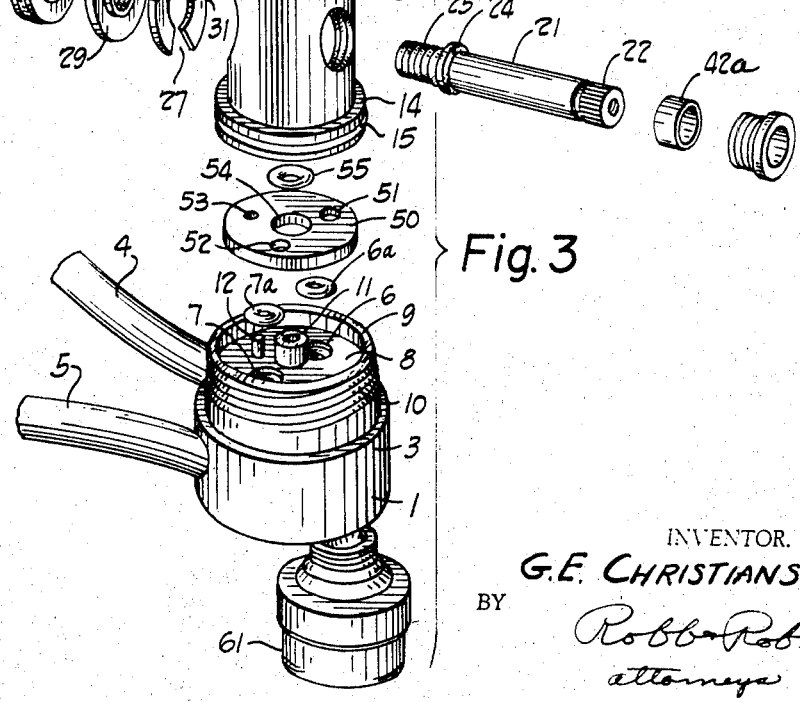

Referring now initially to FIGURES 1 and 3, it will be understood that the valve of this invention includes a body 1 as shown in perspective in FIGURE 3 as being of generally cylindrical form with a pair of fluid inlet tubes 4 and 5 which by reason of passages in the body 1 are directed to outlet ports 6 and 7 respectively, these ports being located at a seat face 8 which is of planar form.

Extending upwardly from the seat face 8, is a circular wall 9, exteriorally threaded at 10.

Arranged axially of the seat face 8 is the discharge outlet 11 which extends upwardly somewhat from the seat face 8, there being a positioning pin 12 intermediate the discharge outlet 11 and the circular wall 9, this positioning pin being arranged for the purposes which will be explained subsequently.

Designed to be positioned as viewed in the figures, above the body 1, is a control barrel 13 which is a cylindrical member having at its lower end an outwardly extending shoulder 14, the shoulder 14 being provided intermediate its upper and lower surfaces with a suitable sealing ring 15 in the form of an O-ring.

The control barrel 13 is of substantial height and is provided on its axis with an outlet 16 for the mixing chamber which is located in the area indicated at 17, there being no actual separate section of any substantial volumetric capacity but for the purposes of this invention the mixing taking place in this general area as will be understood from subsequent description.

Extending at right angles to the axis of the control barrel 13, is a bore 18 of cylindrical nature, extending about to the axis and terminating at a face 19 which constitutes one of the seats for the control means hereof.

The bore 18 is in alignment with a bore 20 of reduced diameter, this bore 20 being designed to support therewithin a control member or stem 21 having the usual broached section 22 at one end to engage a handle or knob 23 having a similar broached area so that by rotation of the knob 23 the stem or control member 21 may likewise be rotated.

The stem 21 includes a shoulder 24 near the end opposite the broached end 22 previously mentioned, and adjacent this shoulder 24 is a threaded part 25 extending to the end of the stem 21.

The threaded part 25, as indicated in the figures, extends through a sealing means 26, being a washer-like member, with an area comprising a segment 27 removed therefrom and a positioning opening 28 extending therethrough opposite the area 27.

The threaded portion of the stem 25 is designed to engage a pressure plate 29 which is a flat disc-like member having a shoulder 30 extending out of the face thereof and arranged to be positioned within the opening 31 of the sealing means 26.

Figure 4:
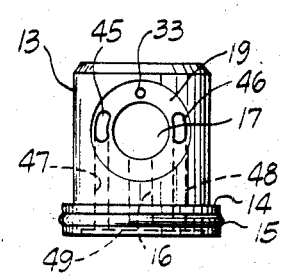
FIGURE 4 is a view in elevation of the control valve to illustrate the position of certain passages with respect to one another.

A positioning opening 32 is formed in the pressure plate 29, the openings 28 and 32 engaging a positioning pin 33 as seen in FIGURES 1 and 4.

A thrust plate 35 is formed as seen in FIGURES 1 and 3, with a plastic insert 36 positioned centrally thereof and having the depression 37 centrally arranged to act as a thrust shoulder for the stem 21, the plate being arranged in the bore 18 and sealingly located therein by the provision of an O-ring 38 located in groove 39 around the periphery of the plate 35.

Providing retaining and backup means for plate 35, is a cap 40 having the opening 41 therein through which the stem 21 extends.

Figure 2:
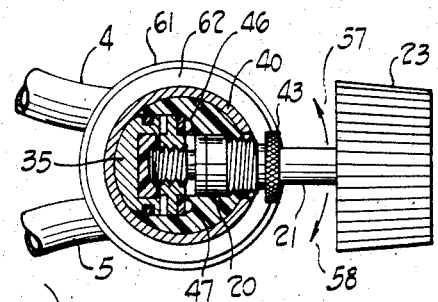
FIGURE 2 is a cross-sectional view taken about on the line of 2—2 of FIGURE 1 looking in the direction of the arrows.

As will be understood from a consideration of FIGURES 1 and 2, the cap as to the cylindrical wall 42 thereof, provides a surface at the interior against which the thrust plate 35 may operate, when the stem 21 is rotated. To provide for thrust opposite that of the plate 35, is a sealing member 42a which is in turn maintained in position against the shoulder 24 by means of a packing nut 43, the packing nut 43 having threads 44 thereon engaging mating threads in the barrel 13.

Located in the face 19 of the barrel 13, are the discharge ports 45 and 46, which are in turn connected by passages 47 and 48 respectively to the seat area 49 at the lower end of the barrel 13.

Intermediate the body 1 and specifically the seat face 8 thereof, and the seat area 49 of the barrel 13, is a seal disc 50 as indicated in FIGURE 3, having openings 51 and 52 therethrough in alignment with the outlet ports 6 and 7 respectively, being maintained in such alignment by reason of the positioning opening 53 therein which engages the positioning pin 12 previously described.

The seal disc 50 also includes a centrally disposed opening 54 positioned over the discharge outlet 11.

The disc 50 is designed to retain O-rings 6a and 7a in the outlet ports 6 and 7 respectively and a sealing O-ring 55 is located above the disc 50 on the discharge outlet 11 in a suitable opening 56 formed in the barrel 13 around the outlet 16 for the mixing chamber.

The positioning pin 12 extends through the disc 50 as previously noted and specifically the opening 53 therein, into an arcuate slot through the seat area 49, the slot being designated 56a, the slot 56a providing for limited rotational movement of the barrel 13 around the axis thereof and with respect to the body 1.

The rotation of the barrel 13 is in the direction of the arrows 57 and 58, and by such rotation which for purposes hereof will be termed a swinging action, the outlet ports 6 and 7 are simultaneously or alternatively connected with the passages 47 and 48 respectively in the barrel so as to vary the amount of fluid entering either or both of said passages, the passage 47 for example being designed to carry the hot water and 48 the cold water.

It will be apparent that the water will thereby be directed to the ports 45 and 46 at this point and by reason of the face 19, rotation of the handle 23 and stem 21 thereby will move the pressure plate 29 toward and from the sealing means 26, which sealing means is thereby either caused to engage to seal face 19 and thus close the ports 45 and 46 or to simultaneously move away from such face and thus open the ports 45 and 46 in more or less amount according to the amount of rotation of the handle 23 and the stem 21 thereby, this being effected, of course, by the threads 25 on the stem engaging the threads in the pressure plate 29 previously described.

When the sealing means 26 is moved away from ports 45 and 46 so as to permit water to flow therefrom, the water in turn moves downwardly through the segmental cut-out 27 in the sealing means 26 and is directed to the outlet 16 from the said segmental cut-out to the discharge outlet 11 and thence through the body 1 to the ultimate spout portion 60 which in this instance is shown as having the conventional aerator 61 connected thereto.

In order to maintain the barrel 13 in connected relation with the body 1, a suitable slip nut 61 is provided, and as indicated in FIGURE 1 engaged with the threads 10 of the body 1, the inwardly extending shoulder 62 of said slip nut pressing a sealing washer 63 onto the shoulder 14 of the barrel 13 with sufficient pressure to not only effect a sealing action but to also regulate the swinging action of the barrel 13 in the direction of the arrows 57 and 58 as previously mentioned.

The barrel 13 may be preferably made of a suitable plastic so that corrosion and the often bad effects of various waters is not liable to in turn adversely affect the operation of the unit as a whole.

It will be understood that the stem 21 by reason of its arrangement with respect to the cap 40 will maintain said cap in its location around the barrel 13 to provide the necessary thrust area for the thrust plate 35.

From the foregoing, the operation of the mixing valve is believed to be clear it being summarized by stating that swinging action of the barrel by the stem 21 and of course the handle 23 at the end thereof will vary the volume of hot and cold water being admitted through the passages 47 and 46 respectively, whilst rotation of the stem itself will permit the flow of water in varying volume to the spout discharge, all of the foregoing being very simply related and effectively designed for the simplest construction at the least cost.

I claim:

1. In a mixing valve of the class described, in combination, a body, a pair of fluid inlet passageways leading to outlet ports in said body at a seat face formed on said body, a fluid discharge outlet through the body, a control barrel having a seat area thereon disposed adjacent the said seat face, said barrel being rotatable with respect to the body, passages extending from the seat area to a mixing chamber in the barrel, inlet ports for said passages, said inlet ports being selectively positionable by rotation of said barrel to receive fluid from one or both said outlet ports in the body, discharge ports for said passages, means to maintain said barrel in sealed relation with the body, control means having control elements in said mixing chamber including sealing means movable toward and from the discharge ports to regulate fluid flow into the chamber, an outlet for said chamber leading to said discharge outlet, and a control member mounted in the barrel for rotation independently thereof to move the sealing means toward and from said discharge ports, and to rotate the barrel and thereby control fluid flow to the inlet ports in said barrel, said mixing chamber outlet and discharge outlet being in constant connection.

2. A mixing valve as claimed in claim 1, wherein the discharge outlet and the outlet for the mixing chamber are axially positioned at the seat area and seat face, the barrel being rotatable on such axis, and the means to maintain the barrel in sealed relation with the body include a sealing disc intermediate the seat area and seat face.

3. The combination as claimed in claim 2, wherein the sealing disc is restrained against rotation and includes openings therethrough in alignment with the outlet ports, seal rings are provided at said ports, the control barrel includes a shoulder at one end thereof, a collar is positioned around said shoulder and threadedly engaged with the body to provide the rotatable connection of the body and barrel, and the control member extends at right angles to the barrel.

4. The combination as claimed in claim 1, wherein the barrel is rotatable on a connecting axis extending through the discharge and mixing chamber outlets, the control means are arranged on an operating axis at right angles to the connecting axis, the control elements include a thrust plate, a pressure movable toward and from said thrust plate, a pressure disc constituting a sealing means movable toward and from the said discharge ports, the control member is positioned on the operating axis and includes means to move the pressure plate and thereby the disc toward and from the discharge ports, said control member having an operating handle connected thereto to effect the rotation as stated, and a cap for the barrel.

5. The combination as claimed in claim 1, wherein the barrel is rotatable on a connecting axis extending through the discharge and mixing chamber outlets, the control means are arranged on an operating axis at right angles to the connecting axis, the control elements include a thrust plate, a pressure plate movable toward and from said thrust plate, a pressure disc constituting the sealing means movable toward and from the discharge ports, the control member is positioned on the operating axis and includes a threaded extremity engaging a mating threaded section in the pressure plate, positioning means engage the barrel, plate and sealing disc to restrain the plate and disc against rotation whilst permitting reciprocating action thereof toward and from the discharge ports, said control member having an operating handle connected thereto to effect the rotation as stated, and a cap for the barrel providing a seat for the thrust plate, said cap being retained in position by the control member.

6. The combination as claimed in claim 1, wherein the barrel is rotatable on a connecting axis extending through the discharge and mixing chamber outlets, the control means are arranged on an operating axis at right angles to the connecting axis, the control elements include a thrust plate, a pressure plate movable toward and from said thrust plate, a pressure disc constituting a sealing means movable toward and from the said discharge ports, said disc having a segment cut therefrom to provide fluid passage to the mixing chamber outlet, the control member is positioned on the operating axis and includes means to move the pressure plate and thereby the disc toward and from the discharge ports, said control member having an operating handle connected thereto to effect the rotation as stated, and a cap for the barrel providing a seat for the thrust plate, said cap being retained in position by the control member.

7. The combination as claimed in claim 4, wherein means are provided between the body and barrel to limit the relative movement of the same between positions affording maximum and zero fluid flow from the body outlet ports to the barrel inlet ports.

References Cited

UNITED STATES PATENTS

| | | | |
|---|---|---|---|
| 1,758,552 | 5/1930 | Allen | 137—636.2 |
| 2,214,619 | 9/1940 | Krieger | 137—636.3 |
| 2,309,900 | 2/1943 | Herring | 137—636.3 |
| 2,766,774 | 10/1956 | Mornard | 137—636.3 |
| 2,949,923 | 8/1960 | Clerc | 137—636.3 X |
| 2,966,928 | 1/1961 | Fairchild | 137—636.3 |

CLARENCE R. GORDON, Primary Examiner

U.S. Cl. X.R.

137—607